United States Patent [19]
Laing

[11] 3,824,035
[45] July 16, 1974

[54] HOUSING FOR CENTRIFUGAL PUMPS

[76] Inventor: Nikolaus Laing, Hofener Weg 35 bis 37, 7141 Aldingen bei Stuttgart, Germany

[22] Filed: May 22, 1972

[21] Appl. No.: 255,385

[30] Foreign Application Priority Data
May 27, 1971 Austria .............................. 4577/71

[52] U.S. Cl. ............................. 415/219 C, 417/424
[51] Int. Cl. ....................... F04d 29/42, F04d 17/00
[58] Field of Search ............... 415/219 C, 204, 206; 417/424

[56] References Cited
UNITED STATES PATENTS
1,404,525  1/1922  Hotchkiss...................... 415/219 C
3,467,015  9/1969  Allen............................ 415/219 C FOREIGN PATENTS OR APPLICATIONS
476,246  12/1937  Great Britain ..................... 415/178
911,111  11/1962  Great Britain ..................... 415/204

*Primary Examiner*—Henry F. Raduazo
*Attorney, Agent, or Firm*—Pennie & Edmonds

[57] ABSTRACT

A centrifugal pump having a pump housing which communicates through a first bore in a pipe with the suction side thereof and through a second bore in the pipe with the pressure side thereof.

1 Claim, 1 Drawing Figure

PATENTED JUL 16 1974   3,824,035
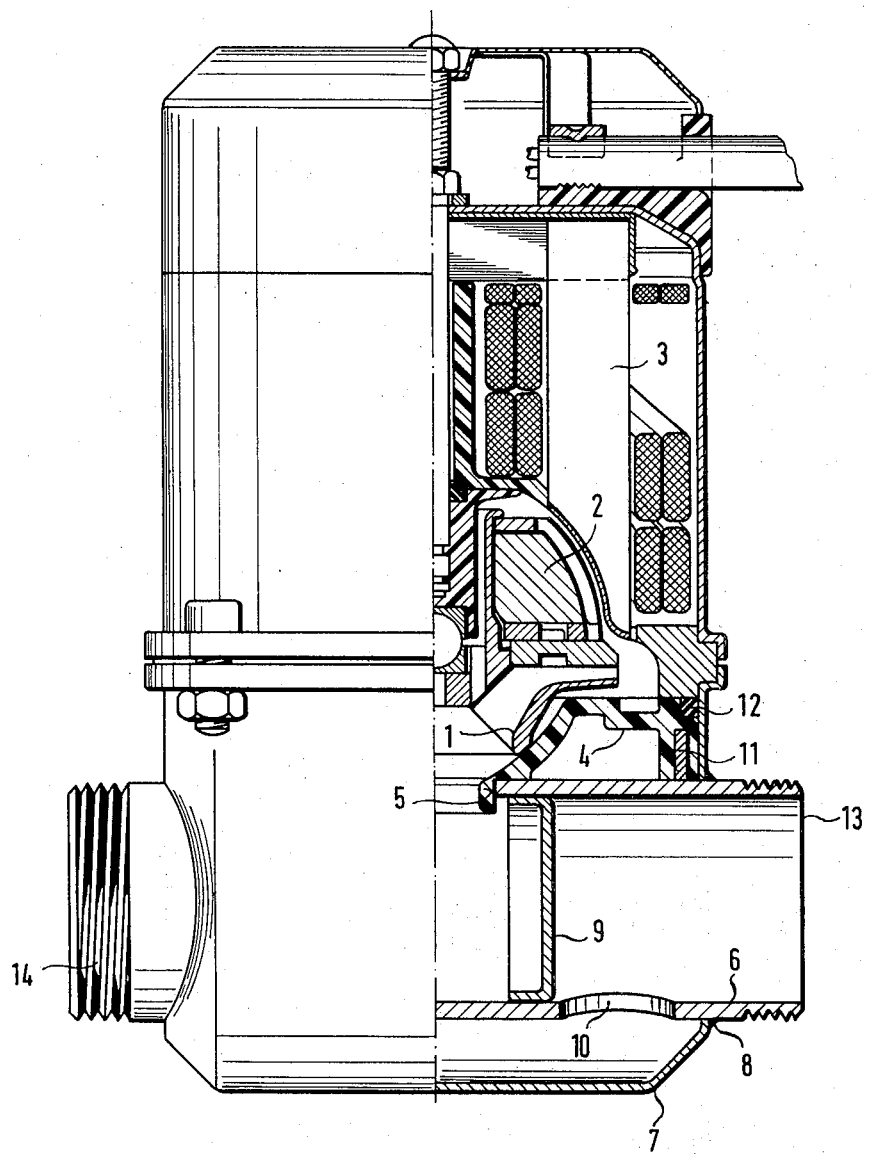

HOUSING FOR CENTRIFUGAL PUMPS

THE PRIOR ART

It is known to arrange centrifugal pumps in piping systems, in particular in hot water heating systems. Hot water heating systems as well as other piping systems as used in the chemical and processing industries in general are assembled of thick-walled pipes. The pump energy required in such systems is extremely low, especially with heating systems for housing purposes, and many times amounts to only a few watts. Yet the pumps must be designed as thick-walled cast iron structures because of forces exerted on the pump housings the pipes which are subjected to thermal expansion and contraction forces which may reach extremely high values. Circulating pumps in such systems, therefore, are very heavy and expensive as compared to their power output.

THE OBJECT OF THE INVENTION

It is the object of the invention to eliminate the use of thick-walled cast iron housings of centrifugal pumps for installation in piping systems.

THE DESCRIPTION OF THE INVENTION

In accordance with the invention a pipe or tube carrying threads or flanges at its ends extends through the pump housing. The pipe is provided with a partition and is formed with an aperture or a bore each at both sides of the partition so that one aperture in the pipe will communicate with the suction side of the centrifugal pump and the other aperture will communicate with the pressure side of the pump.

Any forces generated in the piping system are taken up by the pipe. Thus it is possible to make the pump housing advantageously of low cost materials, such as plastic or thin metal sheet.

The invention will be described further, by way of example and for simplicity, with a straight piece of pipe, however, it is to be noted that the invention is applicable for use with curved pipes.

The FIGURE shows a centrifugal pump according to the invention, partly in cross section.

In the drawing there is shown a pump having a rotor or an impeller 1, an armature 2, a stator of a motor 3, and a spiral housing 4 made of plastic. The pump housing 4 is inserted in an aperture 5 of a tube or a pipe section 6 having a wall thickness dimensioned such as to be sufficient for any pressure forces occurring. The entire unit is surrounded by a thin-walled sheet metal housing 7 through which the pipe section 6 extends and which is sealed along a seam 8, for instance, by soldering. The pipe section 6 comprises a suction or inlet end 14 and a pressure or outlet end 13. A partition 9 is provided in the pipe to separate the suction or inlet aperture 5 from the pressure or outlet aperture 10. The spiral housing 4 is made of plastic and contains a steel ring 11 to prevent deformation under the load of a sealing rubber ring 12.

What is claimed is:

1. A casing for fluid control means where said casing is adapted to be connected to piping subjected to high axial forces, said casing comprising a tubular axially extending heavy pipe section having an inlet end and an outlet end each adapted to be connected to piping and where said heavy pipe section has a side wall thickness sufficient to withstand axial forces subjected to it by said piping, an inlet aperture and an outlet aperture in said side wall, a partition wall in said pipe section between said inlet and said outlet apertures, a flow control means exterior of said pipe section between said inlet and said outlet apertures in the direction of fluid flow for controlling flow of fluid therebetween, and an annular light weight housing having a side wall thickness less than the side wall thickness of said heavy pipe section circumferentially surrounding and sealingly engaging an axial portion of said heavy tubular pipe section including said inlet and said outlet apertures and enclosing said flow control means whereby any axial forces imparted to said casing by said piping are absorbed by said heavy pipe section.

* * * * *